United States Patent [19]

Cantieri

[11] 4,279,439
[45] Jul. 21, 1981

[54] MOLDED LINER FOR PICKUP TRUCKS
[76] Inventor: Thomas B. Cantieri, P.O. Box 626, Farmville, Va. 23901
[21] Appl. No.: 75,592
[22] Filed: Sep. 14, 1979
[51] Int. Cl.³ .............................................. B62D 33/00
[52] U.S. Cl. ..................................... 296/39 R; 105/423
[58] Field of Search ................. 296/39 R; 248/206 R; 105/423

[56]         References Cited
        U.S. PATENT DOCUMENTS

| | | | |
|---|---|---|---|
| 2,911,253 | 11/1959 | Dewey | 296/39 R |
| 3,159,420 | 12/1964 | McCrossen | 296/39 R |
| 3,338,293 | 8/1967 | Hohmann | 248/206 R |
| 3,653,710 | 4/1972 | Barnard | 296/39 R |
| 3,677,951 | 7/1952 | Alles | 248/206 R |
| 4,111,481 | 9/1978 | Nix et al. | 296/39 R |
| 4,186,845 | 2/1980 | Podd | 296/39 R |

FOREIGN PATENT DOCUMENTS 982628  1/1976  Canada ................................ 296/39 R Primary Examiner—David M. Mitchell
Assistant Examiner—Ross Weaver
Attorney, Agent, or Firm—Cushman, Darby & Cushman

[57]            ABSTRACT

A flexible liner for pickup truck beds formed of a monolithic sheet of rubber or vinyl or the like having suction cups on one side or gripping the surface of the truck bed and foldable flaps for protecting the inner surface of the walls and tailgate. The liner flexible enough that it may be rolled up for storage.

8 Claims, 3 Drawing Figures

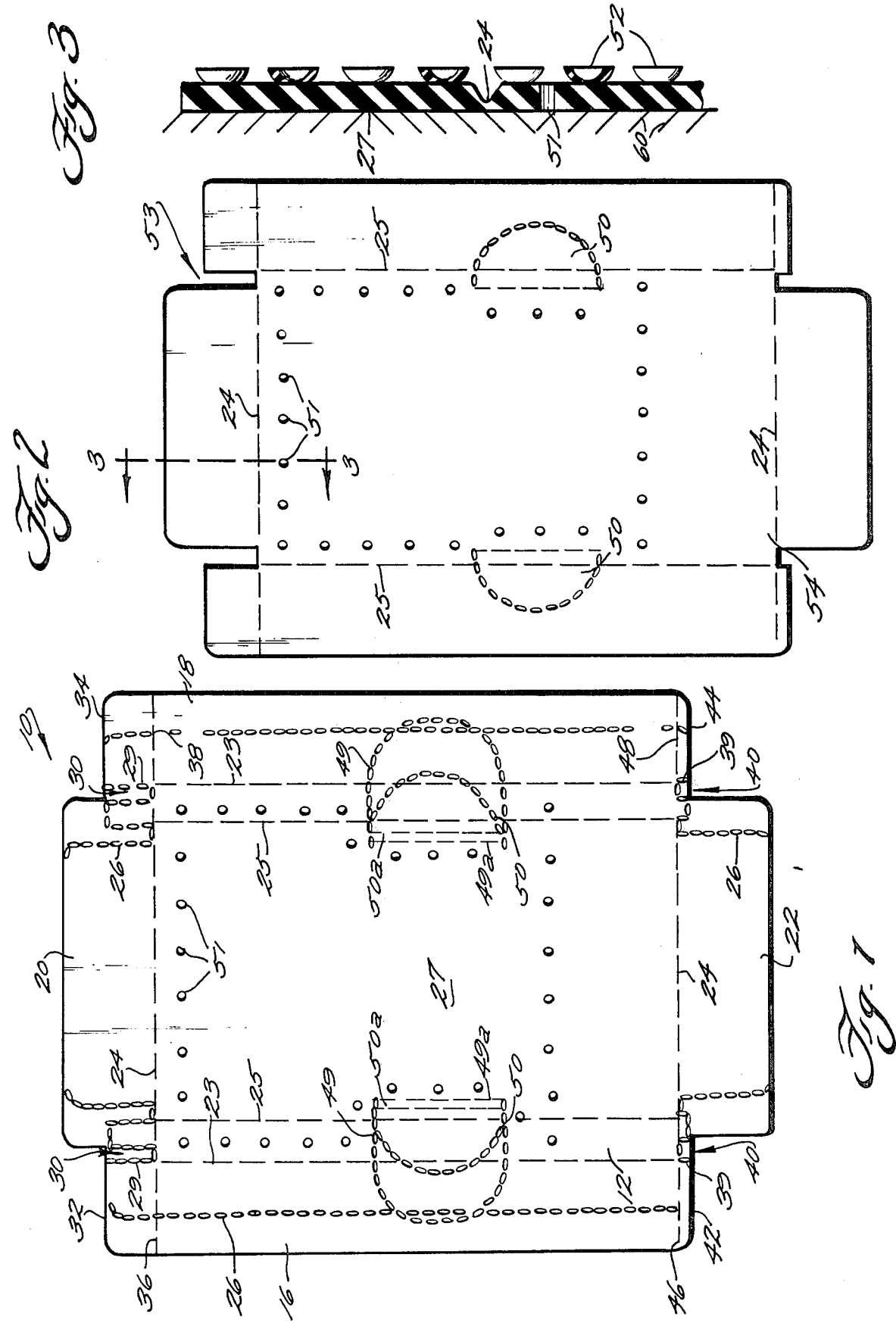

MOLDED LINER FOR PICKUP TRUCKS

BACKGROUND AND SUMMARY OF THE INVENTION

The present invention relates to pickup truck bed liners and more particular to a flexible liner removably fixable to a conventional pickup truck bed by suction cups disposed on the bottom surface of the liner.

Removable liners for pickup truck beds are known. Such liners have previously been used to protect the painted surfaces of the truck bed from scratches, dents and the like so that the trucks may be used to haul cargo without damage to the truck structure or appearance. For example, U.S. Pat. No. 3,881,768 (issued May 6, 1975 to E. L. Nix) shows a pickup truck bed liner which is molded from rigid plastic or fiberglass. The rigid liner conforms to the bed of the pickup truck and includes portions complementary to the bottom sides wheel wells and tailgate of the truck bed. The tailgate portion in the prior liner is effectively hinged to the bottom portion by a web material.

Such rigid liners are disadvantageous for a number of reasons. The liner is very bulky and therefore difficult to handle and store. Also, the hard surface of the liner does not offer protection against damage for many delicate cargo items.

Flexible storage compartment liners for automobile trunks which may be fitted against the side walls and floor of the trunk such as shown in U.S. Pat. No. 2,911,253, issued Nov. 3, 1959 to R. J. Dewey, are also known. However, such liners are hooked to the gutters of the trunk and are not suitable for prolonged use in exterior beds of pickup trucks.

Flexible storage compartment liners with inflatable side wall ribs for station wagons, such as described in U.S. Pat. No. 3,653,710, issued Apr. 4, 1972 to D. J. Barnard, are also known. While such an inflatable liner can be deflated to facilitate handling and storage, it is generally not suitable for prolonged use in the exterior bed of a truck.

With respect to both rigid and flexible prior art liners, a particularly serious problem arises with respect to drainage. Moisture tends to collect and be retained between the liner and truck bed, due to lack of ventilation, often promoting rust.

The present invention overcomes these and other disadvantages of prior pickup truck liners by providing a monolithic, flexible, mat-like liner composed of rubber or the like which has suction cups formed at its bottom surface to releasably hold the mat to the bed of a pickup truck and has sufficient flexibility that it may be rolled up for storage and rolled out for use. The mat also includes integral flaps adapted for folding against the forward and side walls of the bed and the tailgate. Drainage is provided by preforations in the mat in cooperation with the spacing between the liner mat and the floor of the truck bed. Markings are provided on the surface of the mat for cutting the mat to match the wheel wells which extend into the bed from the sides of the body portion of the truck.

By constructing the liner of a flexible material with such cups on one surface, the liner is adequately secured to the bed, while at the same time easily removed from the truck for cleaning or storage. When fitted on the truck bed, the liner not only serves a cosmetic function and protects the bed from damage, it also protects many delicate types of cargo from scratches and breakage due to the resiliency of the material from which it is made. Since the liner is made in the form of a substantially uniform flat sheet of monolithic material, its mass manufacture is relatively inexpensive. In accordance with another feature of the invention, the cosmetic appearance of the pickup truck may be improved by imbedding suitable fibers into the top surface of the liner to give it a carpet-like finish and appearance.

BRIEF DESCRIPTION OF THE DRAWINGS

Further advantages and details of the present invention will be apparent from the following detailed description and accompanying drawings in which like numerals denote like elements, and:

FIG. 1 is a plan view of a first embodiment of the present invention;

FIG. 2 is a plan view of a liner in accordance with the present invention adapted to a second truck bed configuration; and FIG. 3 is an enlarged sectional edge view of a portion of the embodiment shown in FIG. 3.

DETAILED DESCRIPTION OF THE PREFERRED EMBODIMENTS

Referring now to FIG. 1, there is shown a liner 10 for a pickup truck in accordance with the present invention, particularly adapted for widebodied pickups wherein the rear fender protrudes into the bed. The liner may be composed of rubber, vinyl, a rubber compound, a vinyl compound, or similar monolithic material. The liner typically has a thickness of $\frac{1}{8}''$ to $\frac{1}{4}''$ but should be sufficiently thin and flexible that it may be rolled up and maintained as such by its own weight.

The central portion 12 of the liner has a basic rectangular shape of dimensions to conform to the floor of the pickup truck bed in which it is to be fitted. The liner also has side flaps 16 and 18, a front flap 20 and a rear flap 22 which may be respectively folded vertically against the two side walls, front wall and tailgate of the pickup truck. Respective grooves or creases 23, 24 and 25 are provided in the underside of liner 10 corresponding to various truck bed configurations. Slotting perforations generally indicated as 26 are also provided to facilitate cutting of liner 10 to adapt the liner to the various configurations. For clarity of illustration, only two configurations are provided for by the liner 10 of FIG. 1.

Cutting in accordance with perforations 26 will provide a liner 53 as shown in FIG. 2 (with grooves and perforation for the other configuration deleted). Liner 53 is similar to the basic configuration shown in FIG. 1 except that the dimensions of the central portion 54 and the wheel well cut-outs 50 are adapted for narrow pickup truck beds in which the wheels and fenders are substantially outside the bed.

Grooves 23, 24 and 25 effectively locally reduce the liner thickness (e.g., 1/16") to facilitate folding along the grooves. By disposing the grooves on the underside of line 10, a plurality of bed configurations can be accommodated without detracting from the appearance of liner 10. When fitted in a pickup truck bed, the side and front flaps would normally be disposed in a vertical orientation while tailgate flap 22 would be lowered or raised as the tailgate is opened or closed.

In the embodiment shown, front flap 20 does not extend the full width of central portion 12. Perforations 29 are provided to effect respective gaps 30. When liner 10 is fitted in a pickup truck bed, those portions in the side corners of the front wall of the bed not covered by flap 20 are covered by integral flaps 32 and 34 which extend forward from the grooved front edges 36 and 38 of side flaps 16 and 18. Similarly, perforations 39 are provided on either side of rear flap 22 to effect respective gaps 40. When liner 10 is fitted in a pickup truck, those side portions of the tailgate not covered by rear flap 22 are covered by integral flaps 42 and 44 which, respectively, extend rearward from the grooved rear edges 46 and 48 of side flaps 16 and 18.

Perforations 51, typically 3/16" in diameter, are formed around the central flat bed portion 12 of liner 10 so as to provide drainage for water falling on the liner's top surface 27.

The top surface 27 of liner 10 also has molded markings 49 and 50 which indicate where the liner should be cut to accommodate various configurations of pickup truck wheel wells or other encroaching regions extending from the vehicle side wall. Markings 49 and 50 include straight portions 49a and 50a, respectively, coinciding with grooves (hereafter also referred to as 49a and 50a) of reduced liner thickness in the underside of liner 10 for facilitating vertical orientation of the cut-out portions. Perforations may also be provided along the remainder of the markings to facilitate cutting, and to provide additional drainage.

As is illustrated in FIG. 3, the bottom surface of liner 53 (or liner 10) includes rows of molded suction cups 52. Suction cups 52 serve to firmly hold the liner to the truck bed floor and walls and to the wheel wells but permit easy removal when desired. The spaces between adjacent cups 52 permit drainage along the bed of water which passes through the drainage perforations 51 and provide for adequate ventilation so that moisture does not collect between liner and truck bed. Suction cups 52 are disposed so as not to interfere with folding along the various grooves in liner 10 and 53. A drainage perforation 51 and front flap folding groove 24 are also shown in sectional elevation in FIG. 3.

In accordance with another embodiment of the invention, fibers (generally indicated as 60 in FIG. 3) may be partially embedded in the top surface of the liner so as to resemble a carpet. Such fibers should be formed of materials which permit the entire liner to become wet and to be washed without damage. The fibers can be disposed with particular orientations in various regions of the surface 27, to reduce slippage and movement of cargo within the bed.

It will be understood that the above description is of illustrative embodiments of the present invention, and that the invention is not limited to the specific forms shown. For example, laminate materials such as a carpet-type layer disposed on a resilient vinyl compound underlayer can be utilized. Similarly, separate liners 10 can be designed for each respective truck bed configuration, rather than utilizing an adaptable universal liner 10 as described therein. Also the respective reduced thickness grooves can be disposed, if desired, in the front surface 27 of liner 10. Also, the wheel well cut-outs can be totally or partially removed from the liner, if desired. These and other modifications may be made in the design and arrangement of the elements without departing from the spirit of the invention as expressed in the appended claims.

What is claimed is:

1. A liner for protecting the exterior bed of a vehicle, comprising:
   a mat of flexible material, generally conforming to said exterior bed; and
   suction means affixed to the underside of said mat, for removably securing said mat to said bed spaced apart from said bed;
   said mat having drainage holes extending through said mat; whereby drainage of moisture is effected, the space between said mat and said bed providing for ventilation to dry said moisture; and
   means for adapting said liner to a plurality of bed configurations.

2. The liner of claim 1 wherein said exterior bed includes a floor and at least one wall, and said liner includes an integral flap adapted for folding against said wall, said mat further including a localized region of reduced thickness of said flexible integral material to said mat to facilitate folding of said flap against said side wall.

3. The liner of claim 1 wherein said bed includes encroaching regions extending from said wall into said bed, and said liner includes markings indicating a cut to be made to said liner to accommodate said encroaching region.

4. The liner of claim 3 wherein a further localized region of reduced thickness is disposed along the juncture of said encroaching region and said bed floor, whereby a portion of said mat folds against said encroaching region.

5. The liner of claims 1, 3 or 4 wherein said mat is formed of a material selected from the group consisting of vinyl and rubber.

6. The liner of claim 1 wherein said suction means comprises a plurality of suction cups formed integral to said mat.

7. The liner of claims 1, 3 or 4 wherein said mat comprises a resilient substrate; and fibers embedded in said substrate.

8. The liner of claim 1 wherein said means for adapting comprises a respective set of grooves formed in the underside of said mat corresponding to said plurality of bed configurations.

* * * * *